Figure 1:
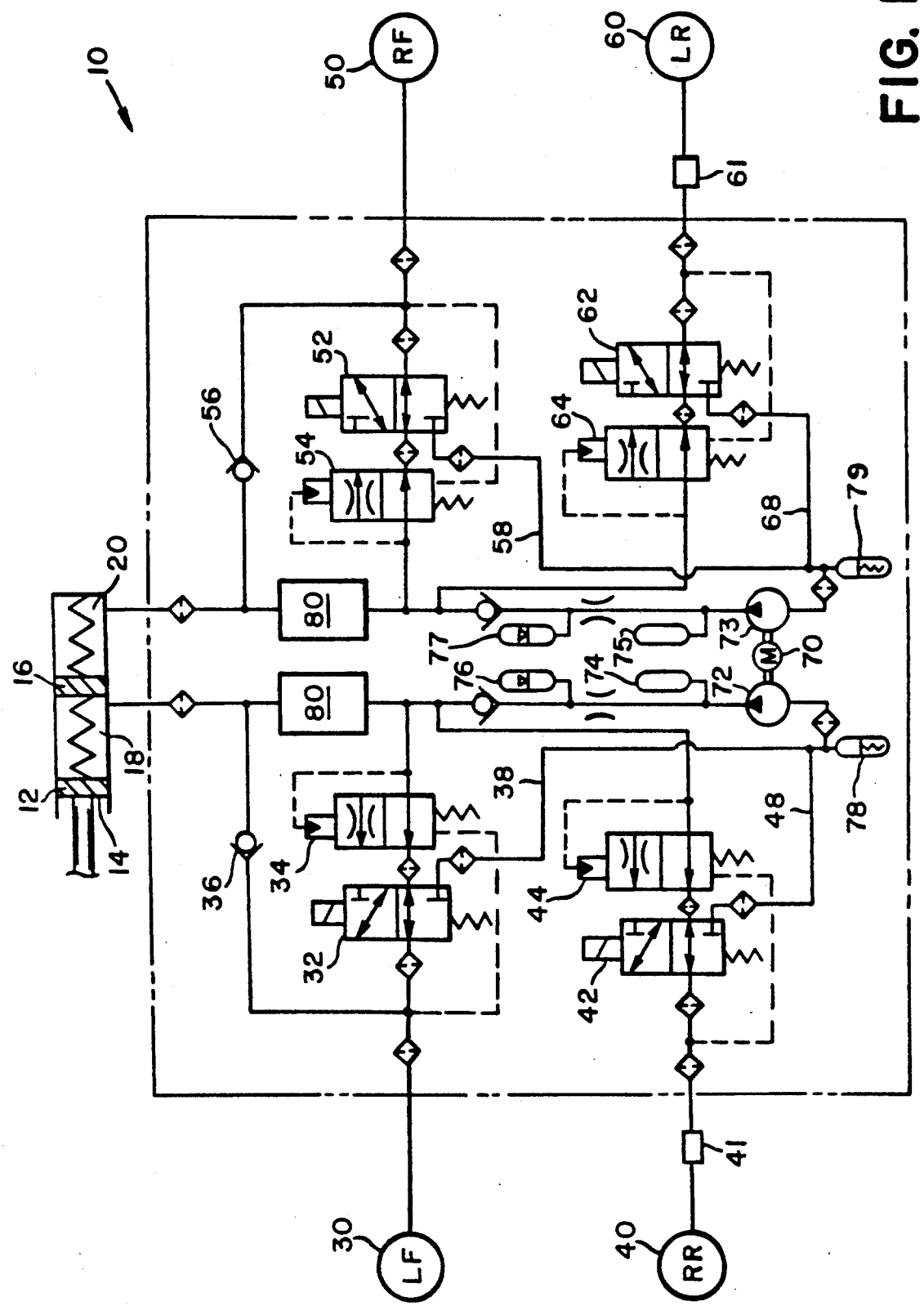

United States Patent [19]

Lindenman

[11] Patent Number: 5,046,788
[45] Date of Patent: Sep. 10, 1991

[54] PRESSURE PILOTED RELEASE VALVE

[75] Inventor: Charles E. Lindenman, South Bend, Ind.

[73] Assignee: Allied-Signal Inc., Morristown, N.J.

[21] Appl. No.: 555,281

[22] Filed: Jul. 19, 1990

[51] Int. Cl.$^5$ .............................................. B60T 8/32
[52] U.S. Cl. .................................... 303/116; 137/508; 303/119; 303/69; 303/84.1
[58] Field of Search .................................. 303/113–119, 303/100, 110, 84.1, 84.2, 68, 69, 28, 59, 60, 66, 67, 86, 81, 72; 137/508, 102, 112, 493.3; 188/181 A

[56] References Cited

U.S. PATENT DOCUMENTS

| | | | |
|---|---|---|---|
| 2,839,078 | 6/1958 | Lornitzo | 137/508 |
| 4,596,265 | 6/1986 | Goodell | 303/69 X |
| 4,887,638 | 12/1989 | Hellquist et al. | 137/508 X |
| 4,962,975 | 10/1990 | Kervagoret | 303/116 |
| 4,971,400 | 11/1990 | Jonner | 303/110 |

Primary Examiner—Douglas C. Butler
Attorney, Agent, or Firm—Larry J. Palguta; Ken C. Decker

[57] ABSTRACT

A pressure piloted release valve (80) is disposed within an adaptive braking system (10) having shuttle valves (34, 44, 54, 64). The release valve (80) provides for a quick release of fluid pressure buildup within the adaptive braking system (10) so that an associated shuttle valve (34, 44, 54, 64) will return to a normal braking position and cease restricting fluid flow with an associated wheel brake (30, 40, 50, 60). The release valve (80) includes a differential area release valve (100) received with a valve body (83) having a stepped bore (90). The valve body (83) includes a frustoconical-shaped body chamber (120) with a radial passage (124) such that displacement of the release valve (100) results in a second end (105) of the release valve (100) engaging sealingly a sloped end wall (102) of the body chamber (120) to prevent fluid flow through a longitudinal through passage (101) of the release valve (100) to a receptacle chamber (85) via the radial passage (124). The valve body (83) includes a poppet check valve passage (123) that communicates with the body chamber (120). A poppet check valve (130) normally permits fluid communication through the longitudinal through passage (101) to a receptacle end opening (84), and fluid pressure received at the receptacle end opening (84) causes the check valve (130) to close. When fluid pressure received from a master cylinder (12) and communicated with a first end opening (88) of the valve body (83) is terminated, the release valve (100) shuttles open very quickly and allows the fluid pressure at the receptacle end opening (84) to be communicated quickly to the master cylinder (12).

20 Claims, 2 Drawing Sheets

PRESSURE PILOTED RELEASE VALVE

The present invention relates generally to a pressure piloted valve, and in particular to a pressure piloted release valve for an adaptive braking system.

Numerous automotive vehicles are being provided with adaptive braking systems. Depending on the type of system utilized, numerous potential problems must be forseen and solved so that the system will not have any possible failure modes. One potential failure mode that can exist in numerous adaptive braking system designs comprises the inability of the system, as a whole, to quickly relieve fluid pressure within the system when adaptive braking system operation is terminated. This can be particularly critical if the adaptive braking system utilizes shuttle valves in conjunction with the electromagnetic solenoid valves. If braking pressure within the system is not relieved quickly after the termination of adaptive braking system operation, the shuttle valves may remain in their shuttled position until the accumulator and wheel brake pressures are depleted in the hydraulic circuit. If the brakes are re-applied by the vehicle operator during the time that the shuttle valves remain in their shuttled position, then the fluid pressure generated by the vehicle driver is communicated to the wheel brakes via the orifices of the respective shuttle valves, the driver will perceive a brake pedal feel that is unusually firm, and the vehicle will not decelerate as rapidly as possible because of the restriction of fluid flow to the wheel brakes. The slow depletion of hydraulic pressure within the circuit can also cause the rear wheels to continue adaptive braking system cycling after the brake pedal has been released and adaptive braking system operation terminated. Another problem that can be caused with slow depletion of hydraulic pressure within the system is a potential blockage of fluid within the system. If an orifice within the build electromagnetic solenoid valve is blocked, high pressure fluid can be trapped between the outlet of the pump, an isolation check valve and the blocked orifice. This would force an associated shuttle valve to remain in the shuttled position and brake pressure could not be re-applied to the wheel brake. If the build orifice is for a front brake, the vehicle operator could not only be prevented from operating the front brakes but pressure could also be trapped within the rear wheel brake circuits. Depending on the amount of pressure locked in the rear wheel brakes, it is possible that the vehicle could be immobilized or brought to a stop. Thus, it is very important that the hydraulic pressure created within the adaptive braking system during operation be depleted quickly after terminating operation of the adaptive braking system.

The present invention solves the above problems by providing a pressure piloted valve comprising a valve body received within an opening of a receptacle, the valve body extending within said opening to a reduced valve body diameter portion in a receptacle chamber of said opening, the valve body including a stepped bore comprising an enlarged diameter bore section communicating with a small diameter bore section, a release valve disposed within said bore and comprising a large diameter section received within the enlarged diameter bore section and a small diameter section received within said small diameter bore section, the release valve having a through passage, and first and second ends, first resilient means disposed between said release valve and valve body to bias said release valve toward a first end opening of the valve body, the small diameter bore section extending to a valve body chamber which communicates with a radial passage in the valve body, the radial passage communicating with the receptacle chamber, the second end of the release valve disposed opposite and engageable with an end wall of said body chamber, the valve body including a check valve passage communicating with said body chamber, a check valve disposed at an end of said valve body, the check valve biased by second resilient means disposed within said receptacle chamber, fluid pressure at the first end opening causing the second end to engage the end wall and communicating via said longitudinal through passage with said body chamber to cause said check valve to open and permit fluid communication with said receptacle end opening, and fluid pressures received at both said first end opening and said receptacle end opening causing said release valve to engage said end wall and said check valve to close to prevent fluid communication through said check valve passage.

Figure 2:
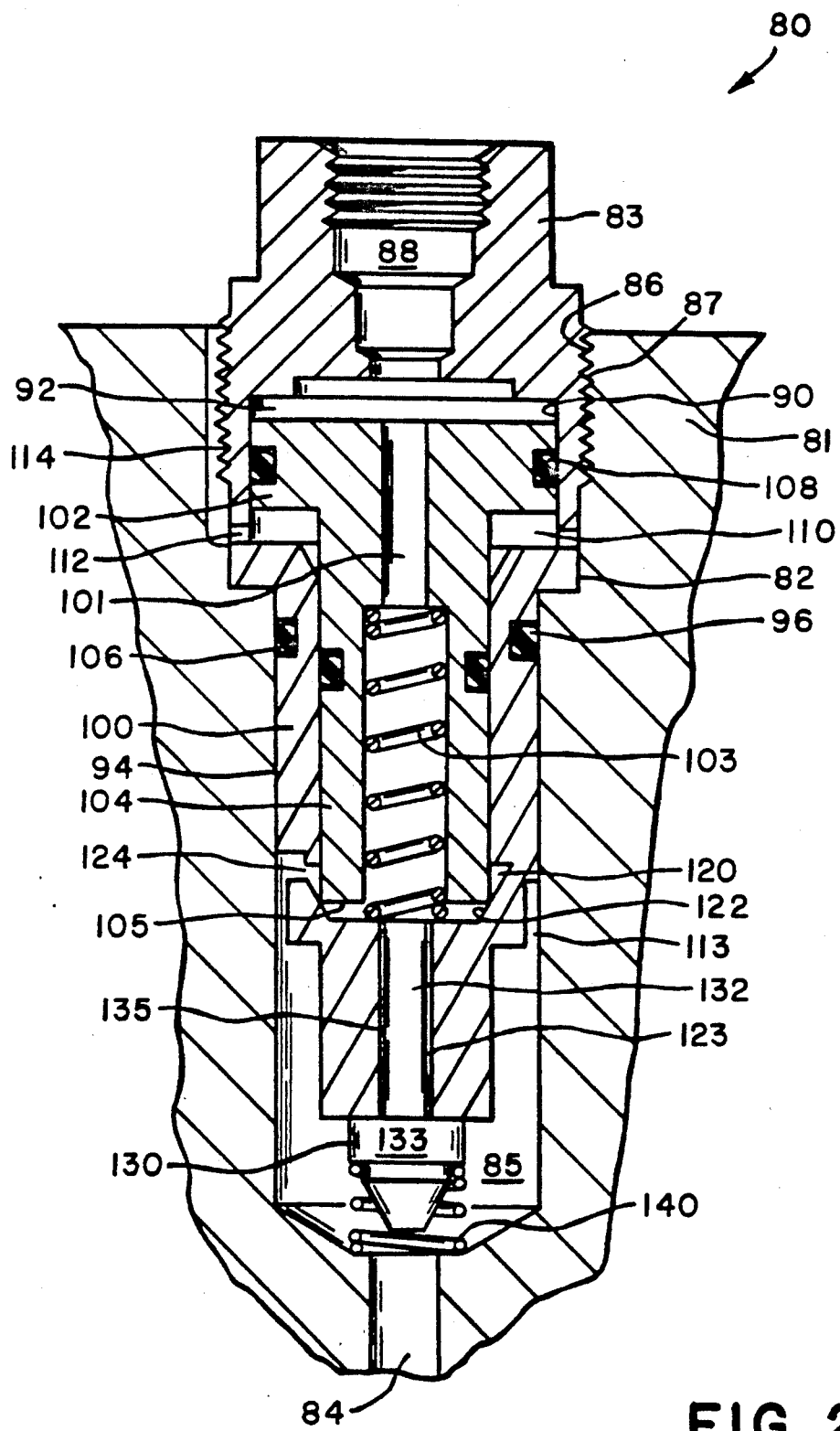

One way of carrying out the invention is described in detail below with reference to the drawings which illustrate an embodiment in which:

FIG. 1 is a schematic illustration of a four channel cross split-pumpback adaptive braking system, and FIG. 2 is a section view of the pressure piloted release valve utilized with each half of the system.

FIG. 1 illustrates an adaptive braking system indicated generally by reference numeral 10. Adaptive braking system 10 includes a master cylinder 12 having a primary piston 14 and a secondary piston 16. Primary pressure chamber 18 and secondary pressure chamber 20 communicate with respective halves of system 10. One half of system 10 comprises the left front wheel brake 30 and right rear wheel brake 40 having respective electromagnetic solenoid build/decay valves 32, 42, and shuttle valves 34, 44. A two-section pump 70 includes a pumping section 72 which, via fluid chamber 74 and accumulator 76, provides fluid pressure to the respective shuttle valves and solenoid build/decay valves during adaptive braking system operation. The left front wheel 30 can experience a release of braking pressure via release check valve 36, Build/decay valves 32, 42 have decay lines 38, 48 communicating with a sump 78 and pumping section 72. Right front wheel brake 50 includes associated build/decay solenoid valve 52, shuttle valve 54, release check valve 56, and decay line 58. Left rear wheel brake 60 communicates with an associated build/decay solenoid valve 62, shuttle valve 64, and decay line 68 which communicates with sump 79 and pumping section 73 of pump 70 which communicates with fluid chamber 75 and accumulator 77. The right rear wheel 40 and left rear wheel 60 each communicate with a respective proportioning valve 41, 61. As illustrated in FIG. 1, the only physical connection between the two half circuits of the cross-split system is the motor pump 70 which drives the pumping sections 72, 73. Each half circuit includes a master cylinder pressure piloted release valve 80 which serves to release quickly hydraulic pressure within the system to the associated master cylinder chamber when adaptive braking system operation is terminated.

The pressure piloted release valve of the present invention is illustrated in detail by FIG. 2. Release valve 80 includes a valve body 83 disposed within an opening 82 of a receptacle 81 such as a modulator. Receptacle end opening 84 communicates with a receptacle chamber 85. Valve body 83 includes a reduced diameter portion 113 which defines part of receptacle, chamber 85. Valve body 83 includes threads 86 which engage with threads 87 of receptacle 81 in order to retain the release valve within the opening 82, and valve body 83 includes thereabout a sealing mechanism 96. Valve body 83 includes a first end opening 88 which communicates with a stepped bore 90. Stepped bore 90 includes an enlarged diameter bore section 92 and a small diameter bore section 94. Valve 80 includes a differential area piston or release valve 100 which includes a large diameter section 102 and a small diameter section 104. Small diameter section 104 includes sealing means 106 and large diameter section 102 includes a seal 108. The sealing means 106 and seal 108 define with bore sections 92 and 94 an intermediate vented chamber 110. Valve body 83 includes a vent 112 which communicates with a groove 114 in threads 87 so that chamber 110 is vented to atmosphere. Release valve 100 includes a longitudinal through passage 101 which houses first resilient means 103 that biases valve 100 toward first end opening 88. Small diameter bore section 94 of body 83 extends to a body chamber 120 that includes a sloped end wall or valve seat 122 and a radial passage 124. Radial passage 124 communicates with receptacle chamber 85 via the reduced diameter portion 113. Valve 100 includes a second end 105 which can sealingly engage sloped end wall 122 in order to prevent radial passage 124 from communicating fluid pressure with body chamber 120. Valve body 83 includes a poppet check valve passage 123 that receives a shaft 132 with longitudinal slots 135 of poppet check valve 130. Check valve 130 includes a head 133 which is biased by second resilient means 140 so that head 133 normally closes poppet check valve passage 123. Second resilient means 140 is disposed about head 133 and about receptacle end opening 84.

The master cylinder pressure piloted release valve operates each time the master cylinder is activated. When pressure is received from the primary and secondary chambers, the respective release valve 80 receives the pressure at the first end opening 88 and pressure exerted upon the large diameter section 102 relative to the small diameter section 104 causes valve 100 to move downwardly. When valve 100 moves downwardly second end 105 engages sealingly sloped end wall or valve seat 122 (FIG. 2) so that fluid pressure transmitted via longitudinal through passage 101 cannot communicate with radial passage 124. However, poppet check valve 130 is displaced downwardly against second resilient means 140 so that fluid pressure received at the first end opening is communicated via through passage 101, longitudinal slots 135 and through passage end opening 124 to receptacle end opening 84. Thus, during each normal braking operation, fluid pressure from the master cylinder passes through release valve 80 and to the associated wheel brakes.

During operation of adaptive braking system 10, the vehicle operator is operating master cylinder 12 so that fluid pressure is transmitted to each of the release valves 80. This displaces release valve 100 into the illustrated activated position (FIG. 2) so that fluid pressure cannot be communicated between sloped end wall 122 and second end 105. Circuit pressure created within the adaptive braking system by means of pump 70 or accumulators 74, 76, 77, and 78, is communicated to the receptacle end opening 84 and receptacle chamber 85. This circuit pressure causes poppet check valve 130 to close so that fluid pressure is not communicated via poppet check valve passage 123. Because the pressure within receptacle chamber 85 is transmitted via radial passage 124 to the longitudinal sidewall of release valve 100 and cannot act upon the second end 105, the release valve 100 remains in the illustrated displaced position so that the master cylinder is isolated from the circuit. However, adaptive braking system operation terminates as a result of the vehicle driver releasing his foot from the brake pedal such the hydraulic pressure within primary and secondary chambers 18 and 20 quickly recedes. Release valve 100 will be biased by first resilient means 103 to an at rest position wherein the large diameter section 102 engages the end of enlarged diameter bore section 92 so that fluid may flow between sloped end wall 122 and second end 105 to communicate with longitudinal through passage 101. Fluid pressure within system 10 is communicated very quickly, upon the release of the master cylinder by the vehicle operator, to the master cylinder so that the system pressure is depleted quickly. This permits high pressure fluid within the system, created by the accumulators or the pump, to travel through release valves 80 and to the master cylinder and reservoir (not shown). Thus, the associated shuttle valves will return to their unshuttled position whereby the respective orifices are removed from the communication fluid path with the respective wheel brake such that any subsequent application of the brakes by the vehicle operator will not result in the fluid pressure being communicated through the orifices of the shuttle valves. The vehicle operator will be able to operate the brakes and experience normal braking operation of the system. The brake pedal will not transmit to the operator any unusually firm reaction force and the vehicle will decelerate as it usually decelerates during normal braking. There will be no continued short term adaptive braking system cycling of any of the wheels subsequent to brake pedal release. Likewise, if any of the build orifices become blocked, fluid pressure will be relieved from the system so that the shuttles will return to their deactivated position and fluid pressure will not be trapped within the circuit.

I claim:

1. A pressure piloted valve comprising a valve body received within an opening of a receptacle, the valve body extending within said opening to a reduced valve body diameter portion to define a receptacle chamber between said diameter portion and said opening, the valve body including a stepped bore comprising an enlarged diameter bore section communicating with a small diameter bore section, a release valve disposed within said bore and comprising a large diameter section received within the enlarged diameter bore section and a small diameter section received within said small diameter bore section, the release valve having first and second ends, a longitudinal through passage, and a seal disposed about said large diameter section and sealing means disposed about said small diameter section to define with said valve body an intermediate vented chamber, first resilient means disposed between said release valve and valve body to bias said release valve toward a first end opening of the valve body, the small diameter bore section extending to a valve body chamber which communicates with a radial passage in the valve body, the radial passage communicating with the receptacle chamber, the second end of the release valve disposed opposite a sloped end wall of said body chamber, the valve body including a poppet check valve passage communicating with said body chamber, a poppet check valve disposed at an end of said valve body and at said receptacle chamber, the poppet check valve biased by second resilient means disposed within said receptacle chamber so that the check valve controls fluid flow received via a receptacle end opening and communicating with said poppet check valve passage, fluid pressure received at said first end opening causing said release valve to be displaced and the second end of the release valve to engage sealingly said sloped end wall, such that the fluid pressure communicates via said longitudinal through passage with said body chamber and causes said poppet check valve to open and permit fluid communication with said receptacle end opening, and fluid pressures received at both said first end opening and said receptacle end opening causing said release valve to be displaced such that the release valve engages said sloped end wall and said poppet check valve closes to prevent fluid communication through said poppet check valve passage.

2. The piloted valve in accordance with claim 1, wherein the release valve includes an enlarged portion of the through passage and which houses said first resilient means.

3. The piloted valve in accordance with claim 1, wherein said body chamber comprises a frustoconical-shaped body chamber.

4. The piloted valve in accordance with claim 1, wherein the poppet check valve comprises a longitudinal shaft connected with a head, the longitudinal shaft received slideably within said poppet check valve passage.

5. The piloted valve in accordance with claim 4, wherein said shaft includes longitudinal slots which permit fluid flow through said check valve passage when said head does not engage sealingly the valve body.

6. The piloted valve in accordance with claim 1, wherein said second resilient means is disposed between a shoulder on said head of the poppet check valve and a shoulder of said receptacle chamber, the receptacle chamber shoulder surrounding said receptacle end opening.

7. The piloted valve in accordance with claim 1, wherein said valve body includes threads adjacent said first end opening which engage threads of said receptacle in order to position said piloted valve within said receptacle.

8. The piloted valve in accordance with claim 7, wherein the valve body includes a vent opening which communicates with a groove within said threads of the receptacle in order to communicate said intermediate vented chamber with atmosphere.

9. The piloted valve in accordance with claim 1, wherein said valve body includes a seal mechanism disposed thereabout in order to contain fluid within said opening of the receptacle.

10. The piloted valve in accordance with claim 1, wherein pressure received at the first end opening comprises master cylinder generated pressure, and pressure received at the receptacle end opening comprises an adaptive braking circuit generated pressure.

11. The piloted valve in accordance with claim 10, wherein the adaptive braking system generated pressure is provided by a pump and an accumulator.

12. The piloted valve in accordance with claim 11, wherein said piloted valve permits a quick release of fluid pressure from the adaptive braking system so that an associated shuttle valve returns to a normal braking position and a shuttle valve orifice ceases to restrict fluid flow to an associated wheel brake.

13. A pressure piloted valve comprising a valve body received within an opening of a receptacle, the valve body extending within said opening to a reduced valve body diameter portion in a receptacle chamber of said opening, the valve body including a stepped bore comprising an enlarged diameter bore section communicating with a small diameter bore section, a release valve disposed within said bore and comprising a large diameter section received within the enlarged diameter bore section and a small diameter section received within said small diameter bore section, the release valve having a through passage, and first and second ends, first resilient means disposed between said release valve and valve body to bias said release valve toward a first end opening of the valve body, the small diameter bore section extending to a valve body chamber which communicates with a radial passage in the valve body, the radial passage communicating with the receptacle chamber, the second end of the release valve disposed opposite and engageable with an end wall of said body chamber, the valve body including a check valve passage communicating with said body chamber, a check valve disposed at an end of said valve body, the check valve biased by second resilient means disposed within said receptacle chamber so that the check valve controls fluid flow received via a receptacle end opening, fluid pressure at the first end opening causing the second end to engage the end wall and communicating via said through passage with said body chamber to cause said check valve to open and permit fluid communication with said receptacle end opening, and fluid pressures received at both said first end opening and said receptacle end opening causing said release valve to engage said end wall and said check valve to close to prevent fluid communication through said check valve passage.

14. The piloted valve in accordance with claim 13, wherein the release valve includes an enlarged portion of the through passage and which houses said first resilient means.

15. The piloted valve in accordance with claim 13, wherein said body chamber comprises a frustoconical-shaped, body chamber.

16. The piloted valve in accordance with claim 13, wherein the check valve comprises a longitudinal shaft connected with a head, the longitudinal shaft received slideably within said check valve passage.

17. The piloted valve in accordance with claim 16, wherein said shaft includes longitudinal slots which permit fluid flow through said check valve passage when said head does not engage sealingly the valve body.

18. The piloted valve in accordance with claim 13, wherein said valve body includes threads adjacent said first end opening which engage threads of said receptacle in order to position said piloted valve within said receptacle.

19. The piloted valve in accordance with claim 13, wherein pressure received at the first end opening comprises master cylinder generated pressure, and pressure received at the receptacle end opening comprises an adaptive braking system generated pressure.

20. The piloted valve in accordance with claim 19, wherein the adaptive braking system generated pressure is provided by a pump and an accumulator.

* * * * *